May 9, 1967 F. P. SELTZER 3,318,352

BREAD DICER

Filed June 17, 1964

INVENTOR
*Fred P. Seltzer.*

3,318,352
BREAD DICER
Fred P. Seltzer, R.D. 2, Enon Valley, Pa. 16120
Filed June 17, 1964, Ser. No. 375,824
2 Claims. (Cl. 146—150)

This invention relates to kitchenware, and more particularly to a piece of kitchenware that is used in connection with cutlery in the form of a knife to dice bread.

The dicing of bread is usually a slow and laborious process of cutting it into little cubes that, when placed in a dish, are found to be anything but evenly cut, no matter how slow and accurate one may try to be.

It is, therefore, the first object of this invention to provide a bread dicer whereby one can quickly dice bread with an ordinary kitchen knife, the result of the dicing being that every cube of bread is exactly like the others.

Another object of this invention is to provide a bread dicer that will greatly reduce the chance of one's cutting himself with the knife.

Another object of this invention is to provide a bread dicer that will permit one to have all of the cubes of bread alike no matter how inexperienced he may be.

Another object of this invention is to provide a bread dicer that can be mass-produced and retailed in every store that handles kitchenware and the like.

Still another object of this invention is to provide a bread dicer that does not contain any complicated parts that must be washed and dried with special care.

These and other objects will be apparent from the following description of one embodiment of the invention, taken in connection with the accompanying drawing forming a part of this specification.

Figure 1:
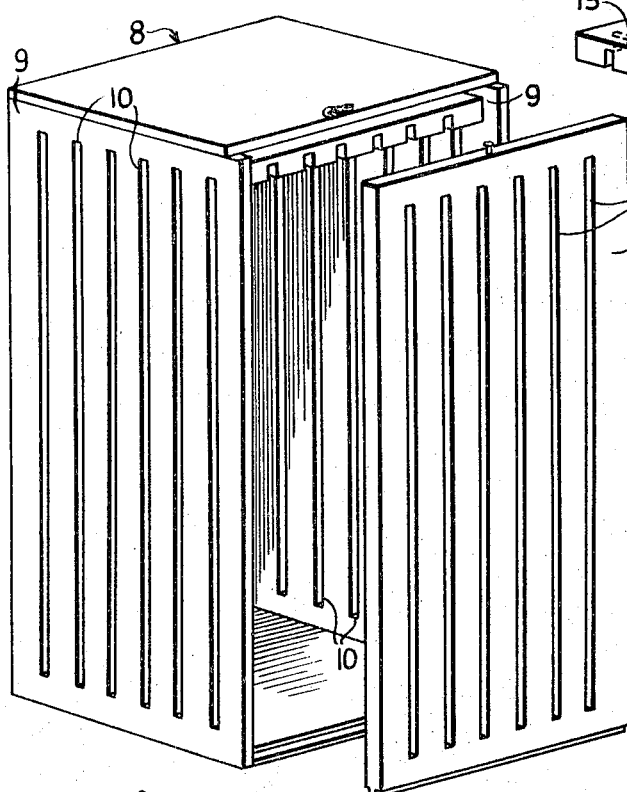
FIGURE 1 is a perspective view of this invention and its lid.
Figure 2:
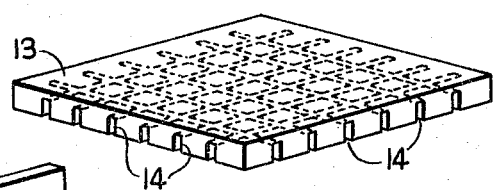
FIGURE 2 is a perspective view of one detail of this invention.
Figure 3:
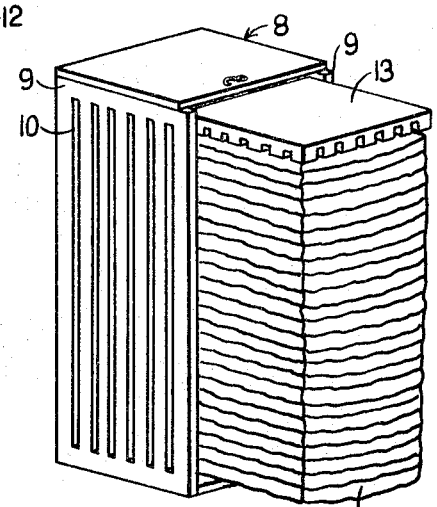
FIGURE 3 is a perspective view of a loaf of bread about to be placed in this invention for dicing.
Figure 4:
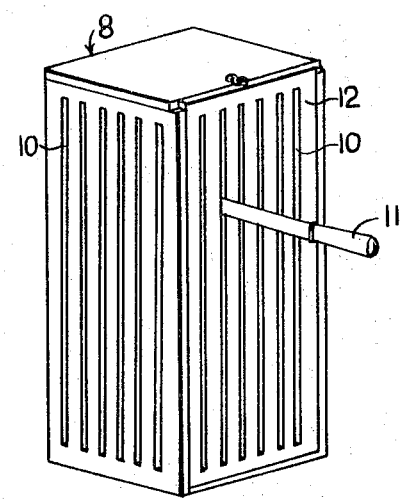
FIGURE 4 is a perspective view of this invention in use.
Figure 5:
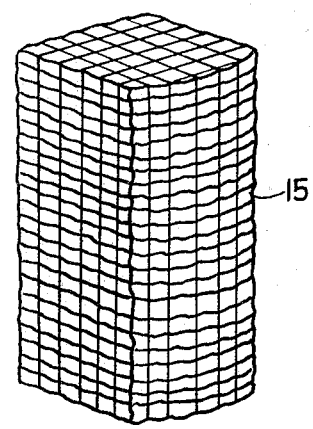
FIGURE 5 is a perspective view of a loaf of bread after it has been diced.

Referring now to the drawing, my invention is seen to comprise a rectangular box 8 that is the shape of, and slightly larger than, a loaf of bread. All three sides 9 of the box (only two of which are shown in the drawing) are provided with a plurality of equally spaced and parallel openings 10 that are slightly wider than the thickness of the typical kitchen knife 11 that is shown in FIGURE 4 of the drawing. The removable lid 12 is likewise provided with a plurality of equally spaced and parallel openings that are also indicated by the same reference numeral 10 that is used to indicate alike openings in the box itself. All of the openings 10 are lengthwise in the box and the removable lid.

An end plate 13 that slidably fits into the aforesaid box 8 is provided with a plurality of recesses 14 in the underside thereof and extending the full length and width of the aforesaid end plate, the purpose of this end plate 13 being that its own weight will exert enough pressure on the end of the bread 15 to hold it, the bread, in place while it is being diced since the aforesaid recesses in this part of the invention are in perfect alignment with the plurality of openings 10 that are located in the side of this invention.

The way in which this invention is used is quite simple. The lid 12 is removed from the box 8 which is now placed on the end. The end plate 13 is placed on top of a loaf of bread 15 which has been stood on end. The bread 15 is now placed in the box 8 and its lid 10 set on the box. A knife 11 will be inserted in a recess 10 just below plate 13, with the top of the blade in the corresponding recess 14. The knife will be guided across the box by said recess 14 and will project through the corresponding recess on the other side. One can quickly and easily position the knife, which is moved downward to the bottom end of the box. This procedure is now repeated in each opening in two sides of the box, or in one side and the lid. The knife 11, of course, will penetrate through the box and protrude out its other side. When the knife 11 has completely sliced the loaf of bread 15 longitudinally in all directions, then the knife is removed from the box 8, the lid 12 is removed, and the loaf of diced bread 15 removed. The end plate 13 is now lifted off the end of the bread, which is ready for use.

While I have herein shown a single embodiment of the invention, it is obvious that the same is not to be restricted thereto, but is broad enough to cover all structures coming within the scope of the annexed claims.

What I claim is:

1. A bread dicer of the character described, comprising a receptacle in which a loaf of bread is placed, the said receptacle having a removable lid and a plurality of equally spaced and parallel openings in both the said receptacle and the said removable lid, the openings being slightly wider than the thickness of the blade of a knife that is placed therein and moved downward the full length of each opening, thereby dicing the said loaf of bread, and an end plate that also has a plurality of recesses the full length and width thereof and in the underside thereof, the recesses being in line with the openings in both the said receptacle and the said removable lid, the said end plate slidably fitting in the said receptacle and exerting enough pressure on the end of the said loaf of bread to hold it in place and form after it is diced.

2. A bread dicer of the character described, comprising a rectangular receptacle the shape of, and slightly larger than, a loaf of bread and in which a loaf of bread is placed, the said receptacle having a removable lid and a plurality of equally spaced and parallel openings in both the said receptacle and the said removable lid, the openings being slightly wider than the thickness of the blade of a knife that is placed therein and moved downward the full length of each opening, thereby dicing the said loaf of bread, and an end plate that also has a plurality of recesses the full length and width thereof and in the underside thereof, the recesses being in line with the openings in both the said receptacle and the said removable lid, the said end plate slidably fitting in the said receptacle and exerting enough pressure on the end of the said loaf of bread to hold it in place and form after it is diced.

References Cited by the Examiner
UNITED STATES PATENTS

| | | | |
|---|---|---|---|
| 179,934 | 7/1876 | Merwin | 146—150 |
| 2,089,980 | 8/1937 | Owen | 146—150.1 |
| 2,609,564 | 9/1952 | Grimm. | |
| 2,679,274 | 5/1954 | Criner | 146—150 |
| 2,692,430 | 10/1954 | Kraft | 146—240 |

ROBERT C. RIORDON, *Primary Examiner.*

J. F. McKEOWN, *Assistant Examiner.*